J. E. WOODBURY.
FOCUSING DEVICE FOR CAMERAS.
APPLICATION FILED SEPT. 5, 1913.
1,166,082.
Patented Dec. 28, 1915.
2 SHEETS—SHEET 1.
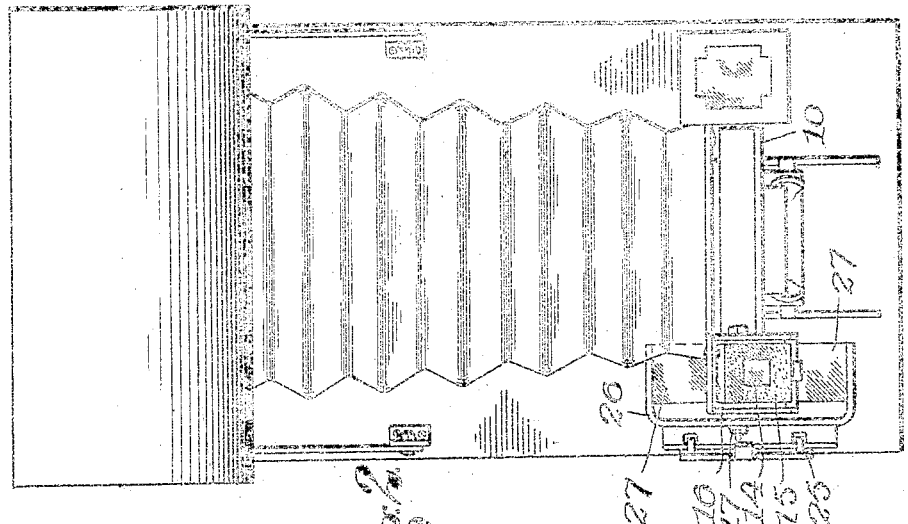
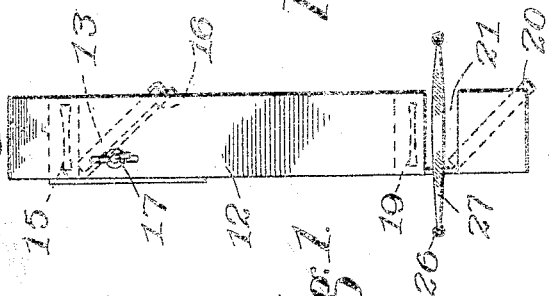
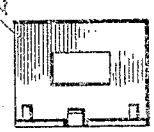
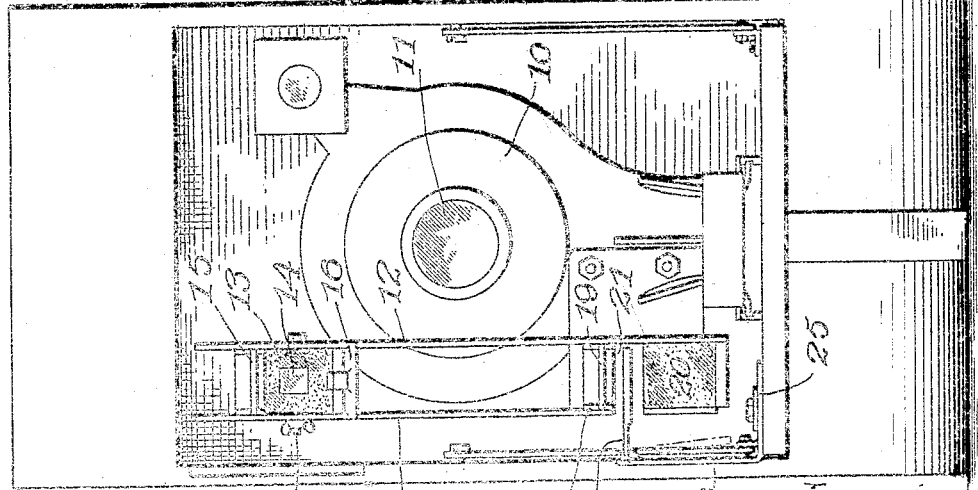

J. E. WOODBURY.
FOCUSING DEVICE FOR CAMERAS.
APPLICATION FILED SEPT. 5, 1913.
1,166,032.
Patented Dec. 28, 1915.
2 SHEETS—SHEET 2.
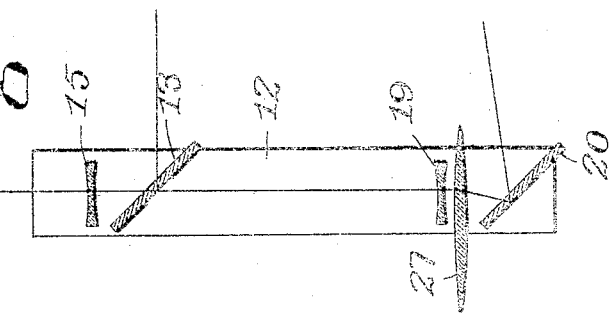
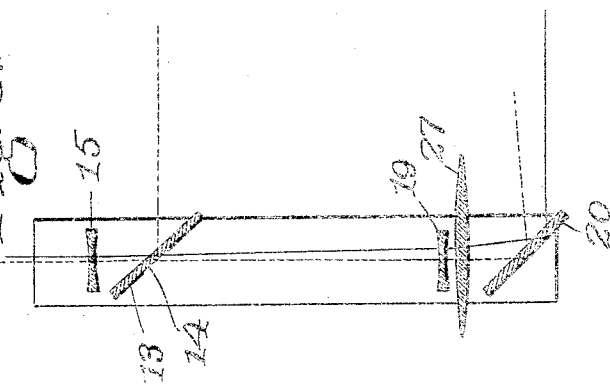
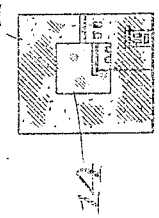
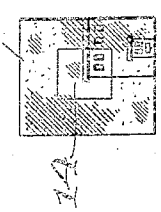
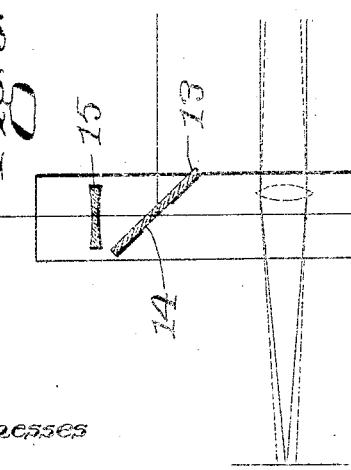
Witnesses
C. F. Nason
C. M. Allen
Inventor
John E. Woodbury
By Attorneys
Southgate & Southgate

UNITED STATES PATENT OFFICE.

JOHN E. WOODBURY, OF WORCESTER, MASSACHUSETTS.

FOCUSING DEVICE FOR CAMERAS.

1,166,032.  Specification of Letters Patent.  Patented Dec. 28, 1915.

Application filed September 5, 1913. Serial No. 788,360.

*To all whom it may concern:*

Be it known that I, JOHN E. WOODBURY, a citizen of the United States, residing at Worcester, in the county of Worcester and State of Massachusetts, have invented a new and useful Focusing Device for Cameras, of which the following is a specification.

This invention relates to a device for ascertaining when a camera is in focus, and the principal objects thereof are to provide a device of this character which can be set in accurate position at the factory so that it will operate accurately at certain distances and with small variations at intermediate distances; to provide a construction for this purpose in which the parts are of such a nature that they can be made by simple and inexpensive processes and that they will take up comparatively little room on the camera and will not interfere with the folding of the parts in the case.

Further objects and advantages of the invention will appear hereinafter.

Reference is to be had to the accompanying drawings in which,

Figure 1 is a front elevation of a camera of well known type showing a preferred embodiment of this invention applied thereto; Fig. 2 is a plan of the same; Fig. 3 is a side view of the attachment; Fig. 4 is a plan of the lower member thereof; Fig. 5 is a diagrammatic side view showing the device set for infinite distances and showing the direction of a light ray coming from an object in focus. Fig. 6 is a similar view showing the instrument adjusted slightly out of focus and indicating the course of a ray from an infinite distance. Fig. 7 is a plan showing the image observed in Fig. 5 when in focus. Fig. 8 is a similar view showing the appearance of the image not in focus, as in Fig. 6, and Fig. 9 is a view similar to Fig. 5 with the device set for focusing on an object at a short distance.

For the purpose of accomplishing the above named objects I provide means (preferably an inclined mirror) for directing rays of light coming from the object on which the camera is being focused to a position for observation, as for example, a reducing glass. At a distance from it I provide a second means (preferably a parallel mirror) for directing other rays from the same object to said reducing glass, so that normally the two images will be in registration. To permit observation of both images the first mirror may have a transparent spot. In order that the second image may be thrown out of registration with the first when the camera is not in focus, I provide means, adjustable with the camera lens, for equally deflecting all the rays coming from the second means or mirror to the first. This means is so made and set that when an object at a given distance is in focus the amount of deflection will be 0°. In other words the focal length of this means, which is a lens, is coördinated with the focal length of the camera lens and the length of the triangulation base, that is the distance between the inclined mirrors or other reflecting devices. The relative adjustment of this lens and the camera lens provides for using different portions of the lens for observing the reflection of the object in one of the mirrors and the consequent deflection to different degrees of the rays passing through it according to its relative position. Thus the two images will register when the camera is in focus. By adjustment of the camera lens and deflecting device in either direction, however, a slight deflection will occur, which will be observed through the reducing glass as lack of registration by the two images.

The attachment is shown as applied to a camera of well known construction comprising a lens holder 10 which is adapted to be adjusted forward and back in the well known way. In the form of the invention shown, the attachment consists of two members, one of which is attached to and moves with the lens 11 of the camera. For this purpose this part of the attachment is shown as comprising a frame having spaced side walls 12. One of these side walls is shown as perforated for the admission of the edge of the holding plate of the camera.

At a point near the top, an inclined mirror 13 (the first directing means above mentioned) is shown having a portion which is not silvered on the back. This is shown as a rectangular opening 14. Above this mirror is a horizontal double concave reducing lens 15. This mirror and lens are shown as formed on an inner frame 16 consisting of metal and adapted to be adjusted on the main frame and secured in adjusted position by a screw and nut 17.

Near the bottom the main frame is provided with another metal frame 18 set into it and having a horizontal negative, preferably a double concave, lens 19 fixed therein.

The outer side wall 12 is cut away below this mirror, and at a point still lower there is a second directing means in the form of an inclined mirror 20. The two reflecting devices 13 and 20 are located substantially in parallelism but for practical purposes they are made to converge downward very slightly. The mirror 13 is at a forty-five degree angle to the horizontal and the mirror 20 may be at 44, or 43½ degrees. Through the glass 15 rays reflected from the same object by both mirrors can be seen, those from the lower one through the opening 14. The whole mechanism so far described is shown as mounted on the frame 12 and moves back and forth with the lens of the camera as it is adjusted for distance. The other portion of the attachment comprises a frame 25 mounted on the bottom plate of the camera and preferably made adjustable thereon, both horizontally and laterally so that it can be fixed in proper position at the factory and secured there before it is shipped. At the top of this frame, which extends upwardly at the side, is pivoted a frame 26 to which is secured a lens 27. The lens 27 is a positive; preferably a double convex spherical, lens of the same focal length as the lens 19.

The frame 26 is adapted to swing up into position and pass through a slot 21 below the lens 19 so that as the camera lens is moved out and in the lens 19 will move to different positions over the lens 27. The two lenses 19 and 27 constitute the deflecting means above mentioned.

The use and function of the device will be best seen with reference to Figs. 5, 6, 7 and 8. In Fig. 5 the parts are shown in the position in which light rays from a great ("infinite") distance fall upon the two mirrors at such an angle that in the position shown, the horizontal rays falling on the mirror 13 are reflected directly through the lens 15 in a vertical direction, while the horizontal rays falling on the mirror 20 are reflected upwardly, rearwardly to a slight extent, and then are deflected first in one direction and then in the other by passing through the two complementary lenses 27 and 19. Consequently, the images from the two rays indicated in Fig. 5 as seen through the lens 15, will be in registration. In other words, a horizontal line as seen at a distance with the parts shifted until the camera is in focus will form a continuous unbroken image through the glass 15 as shown in Fig. 7. But if the object being observed is not in focus, then the image on the silvered part of the mirror 13 will show the horizontal line in one position, whereas the image seen through the unsilvered part will show the horizontal line in another position as indicated in Figs. 6 and 8.

Fig. 9 shows the direction of the light rays and position of the parts when the camera is focused on a near object. In this case, the upper light ray acts in the same way as before and the lower light ray is reflected at a sharper angle and then deflected through the two lenses so that its image coincides with the image of the upper ray. The dot and dark lines in this case show the course of a ray of light from an object near at hand but not in focus. It will be seen that by selecting the proper curvatures of the lenses 27 and 19 and having their focal lengths the same, parallel rays passing through both of them at an inclination from below the lower one will be deflected first in one direction and then in the other and will emerge upwardly from the lens 19 parallel with each other as would be the case if they had passed through a plane prism. By the vertical adjustment of the mirror 13, variations in the local lengths of commercial lenses, including the camera lens, can be compensated for, and the device can be set so that the two points at which the greatest accuracy is obtained can be at any desired distance from the camera, within certain limits.

Another advantage of this invention lies in the fact that the inclination of the two mirrors 13 and 20 are relatively fixed. Thus there is no difficulty due to the well known fact that a change in the angular relation between them would result in a change in direction of the reflected rays equal to twice the angle through which one of the mirrors turned. Furthermore, the deflection of the light is controlled by means that is purely optical, instead of part optical and part mechanical.

Although I have illustrated and described only one embodiment of the invention and shown it as applied to a camera of one type only, I am aware of the fact that it is capable of general application and can be made in many other ways without departing from the scope of the invention as expressed in the claims. Therefore, I do not wish to be limited in these respects, but What I do claim is:—

1. The combination, in a focusing device for a camera having an adjustable lens, of means for directing rays of light from a given line into position to enable the operator to observe said line, a second means, at a distance from the first means, for normally directing rays of light from the same line into the same position, both of said means being movable together with the lens, and means between said first and second means for deflecting the last named rays from said position when the camera is not in focus on said line.

2. The combination, in a focusing device for a camera having an adjustable lens, of means for directing rays of light from a given horizontal line into position to enable the operator to observe said line, a second means, relatively fixed at a distance vertically from the first means, and movable therewith and with the lens for normally directing rays of light from the same line into the same position, and independent means for deflecting the last named rays vertically from said position when the camera is not in focus on said line.

3. The combination in a focusing device for a camera, of means for directing rays of light from a given line into position to enable the operator to observe said line, a second means in fixed angular relation to the first means for normally directing rays of light from the same line into the same position, and independent means for deflecting the last named rays from said position when the camera is not in focus on said line, said independent means and ray directing means being relatively movable.

4. The combination, in a focusing device for a camera, of a pair of reflecting devices both having a fixed inclination, means for observing rays of light reflected from both reflecting devices by the same object in two adjacent fields, and means between one of said reflecting devices and the first named means for deflecting rays of light coming from an object not in focus to a position in which they will be observed out of registration with the rays of light coming from the same object and reflected by the other reflecting device.

5. The combination, in a focusing device for a camera, of a pair of inclined reflecting devices, a reducing glass positioned for observing rays of light reflected from both reflecting devices by the same object, and means located between one of said reflecting devices and the reducing glass for deflecting rays of light coming from an object not in focus to a position in which they will be observed through the reducing glass out of registration with the rays of light coming from the same object and reflected by the other reflecting device.

6. The combination, in a focusing device for a camera, of a pair of inclined reflecting devices, a reducing glass positioned for observing rays of light reflected from both reflecting devices by the same object, and means located between one of said reflecting devices and the reducing glass, and relatively adjustable as the camera lens moves, for deflecting rays of light coming from an object not in focus to a position in which they will be observed through the reducing glass out of registration with the rays of light coming from the same object and reflected by the other reflecting device.

7. In a device of the character described, the combination of nearly a pair of parallel mirrors, one having an unsilvered transparent portion near the center thereof, and adjustable means for equally deflecting all rays of light reflected from the other mirror toward said transparent portion.

8. In a device of the character described, the combination of nearly a pair of substantially parallel inclined mirrors located one above the other, the upper one of said mirrors having an unsilvered transparent portion whereby a ray of light coming from a certain direction on the lower mirror will normally be reflected through said transparent portion, and a ray of light from the same point will be reflected from a point at the same height on the upper mirror, and adjustable means between said mirrors for deflecting the rays of light passing from the lower mirror.

9. In a focusing device for a camera, the combination of two lenses, one a positive lens and the other a negative lens, of substantially the same focal length, one of said lenses being movable in its own plane adjacent to the other, and means connected with said lenses for directing the rays of light through them in adjusted positions and for registering said rays of light with rays coming from the object to be observed without passing through said lenses.

10. In a device of the character described, the combination of a pair of inclined mirrors, one located over the other and both fixed substantially at an incline of forty-five degrees to the horizontal, the upper mirror having an unsilvered transparent portion, and adjustable means for deflecting a ray of light reflected from the lower mirror through said transparent portion, said adjustable means comprising a negative lens in stationary position with respect to said mirrors and a positive lens of the same focal length and located adjacent to the double concave lens, one of said lenses being movable in its own plane for adjustment.

11. In a focusing device, the combination of a pair of reflecting devices substantially parallel with each other, a reducing glass in position for simultaneously observing an object by reflection from both reflecting devices, and a pair of lenses located between one of said reflecting devices and the reducing glass, one a concave lens and the other a convex lens, both having the same focal length, and means whereby one of said lenses can be adjusted along the other for varying the deflection of a ray of light reflected from the mirror beyond the lenses to said reducing glass.

12. The combination in a focusing device for a camera having a lens movable for focusing purposes, of a pair of reflecting devices inclined and substantially parallel with each other, a glass through which light reflected from both reflecting devices can be observed at the same time in two adjacent fields, a double concave lens between one of said reflecting devices and said glass, both of said lenses and reflecting devices being movable with the camera lens, and a double convex lens having the same focal length as said double concave lens in fixed position with respect to the position of the negative in the camera and parallel with said double concave lens, whereby as the camera lens is moved back and forth, the relative positions of the double concave and double convex lenses will be adjusted with it.

13. The combination, in a focusing device for a camera, of a reducing glass, a pair of inclined reflecting devices, means located between one of said reflecting devices and the reducing glass, and relatively adjustable as the camera lens moves, for deflecting rays of light coming from an object not in focus to a position in which they will be observed out of registration with the rays of light coming from the same object and reflected by the other reflecting device, and means for adjusting the distance between said reflecting devices.

14. The combination, in a focusing device, of two reflecting devices having a fixed inclination but adjustable toward and from each other to compensate for inaccuracies and to permit adjustment of the distance of the points of greatest accuracy in focusing, and means between the reflecting devices for deflecting the rays of light reflected from one reflecting device toward the other reflecting device.

15. The combination in a focusing device for a camera, of means for normally directing two separated rays of light from the same point into registering positions for observation by the operator, and means independent thereof for deflecting one of said rays of light, said directing and deflecting means being relatively movable to cause the deflection of one of the rays from the normal position when the camera is not in focus.

16. In a photographic focusing device, the combination with a camera embodying a supporting structure for the sensitive material and a lens structure, said structures being movable relatively to each other to focus the camera lens, of a pair of substantially parallel relatively fixed mirrors carried by one of said structures and means carried by the other of said structures for deflecting a ray reflected by one mirror into or out of parallelism with a ray reflected by the other mirror accordingly as the camera lens is in or out of focus with respect to an object from which both rays emanate.

17. In a photographic focusing device, the combination with a camera embodying a supporting structure for the sensitive material and a lens structure, said structures being movable relatively to each other to focus the camera lens, of a pair of substantially parallel relatively fixed mirrors carried by one of said structures to jointly reflect the image of an object, and two lenses having the same focal length arranged to intercept and deflect said image rays from the object, said lenses being carried by the respective structures so that their axes are relatively movable in parallelism as the structures are moved relatively.

18. In a photographic focusing device, the combination with a camera comprising a support for the sensitive material and a lens carriage movable relatively thereto to focus the camera lens, of a pair of substantially parallel relatively fixed mirrors carried by the carriage and a deflecting lens fixed to the support for deflecting a ray reflected by one mirror into or out of parallelism with a ray reflected by the other mirror accordingly as the camera lens is in or out of focus with respect to an object from which both rays emanate, the said deflecting lens being arranged in a plane transverse to the path of a ray and parallel to the direction of movement as the lens carriage and mirrors are shifted.

19. In a photographic focusing device, the combination with a camera embodying a supporting structure for the sensitive material and a lens structure, said structures being movable relatively to each other to focus the camera lens, of a pair of substantially parallel relatively fixed mirrors carried by one of said structures to jointly reflect the image of an object, and a positive and a negative lens of the same focal length and having parallel axes that are also parallel to said image rays reflected from one mirror, said lenses being relatively movable transversely of the path of said rays proportionately to the relative movements of the two first mentioned structures to vary the relationship of their axes.

20. In a focusing device, the combination with the camera lens, of two parallel separated mirrors and a second lens in position for receiving rays reflected by one of the mirrors and coming from the object on which the camera is being focused, the focal length of which second lens is coördinated with the focal length of the camera lens and the length of the triangulation base, and means whereby a relative rectilinear motion is produced between the second lens and the mirrors as the camera lens is moved for focusing, whereby different portions of the second lens are used for observing the reflection to said object in one mirror and rays so reflected are deflected to different degrees on passing through said second lens according to the different positions of the camera lens, for the purpose of bringing them into registration with the corresponding rays reflected by the other mirror.

21. In a focusing device, the combination with the camera lens, of two parallel separated mirrors and a second lens in position for receiving rays reflected by one of the mirrors and coming from the object on which the camera is being focused, the focal length of which second lens is coördinated with the focal length of the camera lens and the distance between the mirrors, said mirrors being perm.. nently located substantially at 45° to the plane of the second lens, and means whereby a relative rectilinear motion is produced between the second lens and the mirrors in the direction of the plane of the second lens as the camera lens is moved for focusing.

22. In a focusing device, the combination with the camera lens, of two parallel separated mirrors and a second lens in position at an angle of 45° to said mirrors for receiving rays reflected by one of the mirrors and coming from the object on which the camera is being focused, the second lens and the mirrors being relatively movable in the direction in which the camera lens is moved for focusing, whereby different portions of the second lens are used for observing the reflection of said object in one mirror and rays so reflected are deflected to different degrees on passing through said second lens according to the different relative positions of the second lens and mirrors for the purpose of bringing them into registration with the corresponding rays reflected by the other mirror.

In testimony whereof I have hereunto set my hand, in the presence of two subscribing witnesses.

JOHN E. WOODBURY.

Witnesses:
ALBERT E. FAY,
C. FORREST WESSON.

Copies of this patent may be obtained for five cents each, by addressing the "Commissioner of Patents, Washington, D. C."

---

Corrections In Letters Patent No. 1,166,032.

It is hereby certified that in Letters Patent No. 1,166,032, granted December 28, 1915, upon the application of John E. Woodbury, of Worcester, Massachusetts, for an improvement in "Focusing Devices for Cameras," errors appear in the printed specification requiring correction as follows: Page 2, line 86, for the word "local" read *focal;* page 3, lines 64 and 71, claims 7 and 8, strike out the word "nearly", and same page, lines, and claims, before the word "parallel" insert the word *nearly;* and that the said Letters Patent should be read with these corrections therein that the same may conform to the record of the case in the Patent Office.

Signed and sealed this 30th day of May, A. D., 1916.

[SEAL.]

J. T. NEWTON,
*Acting Commissioner of Patents.*